(No Model.)
C. J. GUSTAVESON.
SWEAT PAD.
No. 383,051. Patented May 15, 1888.
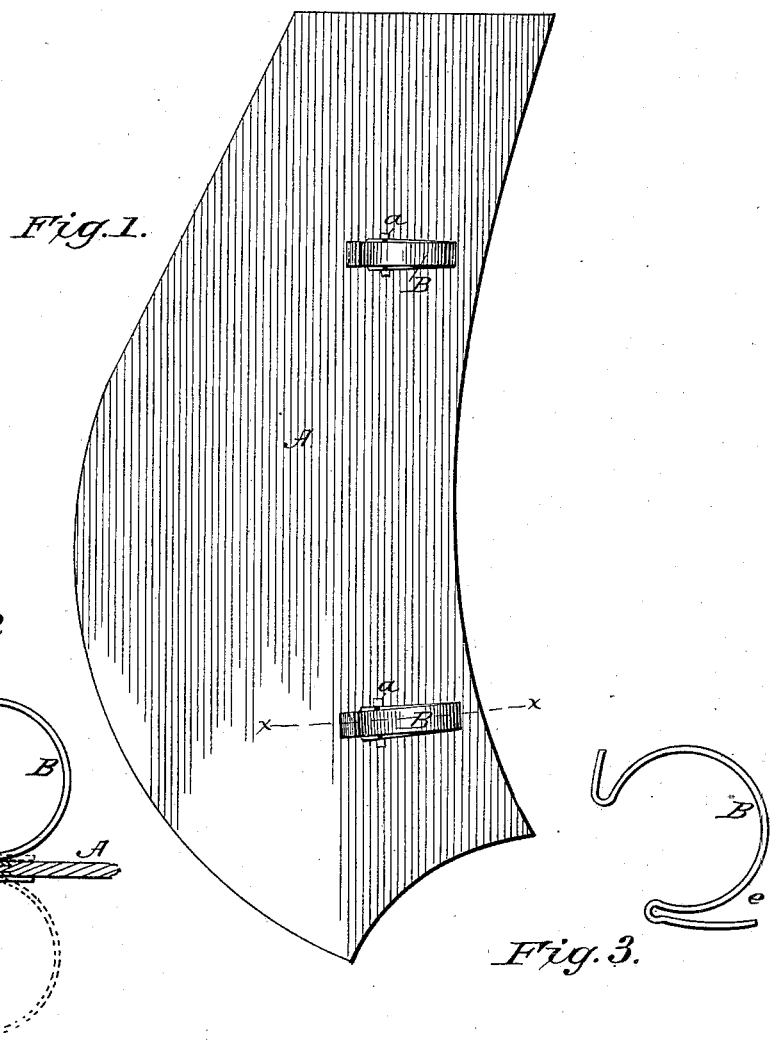
WITNESSES:
Fred G. Dieterich.
Edw. W. Byrn.
INVENTOR:
Chas. J. Gustaveson
BY
Munn & Co.
ATTORNEYS.

UNITED STATES PATENT OFFICE.

CHARLES J. GUSTAVESON, OF SALT LAKE CITY, UTAH TERRITORY.

SWEAT-PAD.

SPECIFICATION forming part of Letters Patent No. 383,051, dated May 15, 1888.

Application filed August 3, 1887. Serial No. 246,083. (No model.)

*To all whom it may concern:*

Be it known that I, CHARLES J. GUSTAVESON, of Salt Lake City, in the county of Salt Lake, Utah Territory, have invented a new and useful Improvement in Sweat-Pads, of which the following is a specification.

My invention is in the nature of an improved sweat-pad for protecting the neck and shoulders of a draft animal; and it consists, mainly, in a reversible pad of leather, wadding, or other suitable material combined with a hook adapted to be connected to either side, and also, further, in a pad having one or more elongated holes or slots near its edge re-enforced by a metal lining or eyelet, and combined with a reversible flat metal hook both of whose ends are made exactly alike, and which hook has one of its ends secured in the metal-lined slot, and is capable of being slipped through said slot, so as to project and form a hook on the other side of the pad when the pad is to be reversed, as will be hereinafter fully described.

Figure 1 is a front elevation. Fig. 2 is a sectional view through the pad at line $x\ x$, and Fig. 3 is a detail of a modified form of hook.

In the drawings, A is one section of the pad, which may be of leather or any other suitable material. Near the inner edge of the pad, where the inner rim of the collar comes, are formed two or more slots or elongated holes, which are re-enforced by eyelets or metal linings $a$. In these re-enforced holes are seated the reversible hooks B, whose function is to embrace the rim of the collar and hold the pad and collar together without the use of straps. This hook is formed of flat spring metal, and each end is made exactly alike—that is to say, each end is bent back sharply on itself, so that the leather or material of the pad is clamped between the ends of the hook and the body portion of the hook where it begins to curve, thus causing the hook to be firmly seated and held in place in the slot of the pad.

The object in making the two ends of the hook alike is to render the said hook reversible with the pad by simply slipping it through the pad until its opposite end becomes seated in the slot, when the hook will project upon the opposite side of the pad, as shown in dotted lines, and the pad may be reversed and used with its opposite side next to the horse. The object of the eyelet or re-enforce of metal at the slot is to give a firm and solid bearing for the hook and a strong connection. These reversible hooks, it will be seen, save a great deal of time and annoyance in changing the hook from one side to the other, and they may be used on neck-pads as well as on shoulder-pads.

In connection with the re-enforced slot or eyelet I do not confine myself to a hook whose opposite ends are made alike, but may use a hook such as is shown in Fig. 3, whose end $e$ fastens into the re-enforced slot, like the other hook, but which, when the pads is to be reversed, is not slipped through the slot, but is taken out and reinserted on the other side.

In manufacturing the pads it will be seen that their structural entirety is such that they may be reversed by the workman or teamster without any cutting or refitting, and without any alteration of or injury to the structure of the pad as originally made.

What I claim is—

1. The herein-described sweat-pad, having one or more openings or slots extending through the pad, combined with a hook having both ends made alike, and adapted to have either end seated in the slot to constitute a reversible pad, substantially as shown and described.

2. A sweat-pad having a re-enforced or eyeleted slot extending through the pad, combined with a flat spring-hook having an end bent as described, and adapted to have said end seated in said slot to constitute a reversible pad, substantially as shown and described.

CHARLES J. GUSTAVESON.

Witnesses:
B. H. SCHEBAN,
L. MOTH IVERSEN.